US005701039A

United States Patent [19]
Parison et al.

[11] Patent Number: 5,701,039
[45] Date of Patent: Dec. 23, 1997

[54] ELECTROMECHANICAL TRANSDUCING

[75] Inventors: James A. Parison, Fitzwilliam, N.H.; Thomas A. Froeschle, Southborough; Robert L. Maresca, Hopkinton, both of Mass.

[73] Assignee: Bose Corporation, Framingham, Mass.

[21] Appl. No.: 504,434

[22] Filed: Jul. 20, 1995

[51] Int. Cl.$^6$ ................................................. H02K 41/00
[52] U.S. Cl. ..................................................... 310/12
[58] Field of Search .................................... 310/12, 13, 14, 310/190, 192, 193

[56] References Cited

U.S. PATENT DOCUMENTS

| | | | |
|---|---|---|---|
| 4,025,810 | 5/1977 | Field | 310/162 |
| 4,859,974 | 8/1989 | Kliman et al. | 335/229 |
| 4,873,462 | 10/1989 | Harned | 310/49 R |
| 4,912,746 | 3/1990 | Oishi | 310/12 |
| 4,981,309 | 1/1991 | Froeschle et al. | 380/707 |
| 5,519,266 | 5/1996 | Chitayat | 310/12 |

Primary Examiner—Thomas M. Dougherty
Assistant Examiner—Judson H. Jones
Attorney, Agent, or Firm—Fish & Richardson P.C.

[57] ABSTRACT

An electromagnetic transducer includes a first member and a second member which are relatively slidable along a path having spaced endpoints and which are electromagnetically coupled. The second member has at least one winding which produces a magnetic field which penetrates the second member. The second member has a plurality of contiguous permanent magnets of alternate polarity along the path which establish a periodic magnetic field which reacts with the magnet field created by the first member so as to produce force along the path. The plurality of contiguous permanent magnets are disposed along the path such that transition lines dividing adjacent ones of the magnets are formed at a non-perpendicular angle to the path to allow gradual transition between flux directions.

6 Claims, 9 Drawing Sheets

FIG. 10 ical transducing. An along-path electromechanical transducer is typically linear and has an electrically controllable force over its range of motion. Such a transducer may, for example, be advantageously employed to actively absorb energy between a wheel and the sprung mass of a vehicle to improve riding comfort. Such an electromechanical transducer is described, for instance, in applicants' prior U.S. Pat. No. 4,981,309, owned by the assignee of this application, the disclosure of which is hereby incorporated by reference.

ELECTROMECHANICAL TRANSDUCING

The present invention relates to electromechanical transducing and more particularly to improvements in along-path electromechanical transducing. An along-path electromechanical transducer is typically linear and has an electrically controllable force over its range of motion. Such a transducer may, for example, be advantageously employed to actively absorb energy between a wheel and the sprung mass of a vehicle to improve riding comfort. Such an electromechanical transducer is described, for instance, in applicants' prior U.S. Pat. No. 4,981,309, owned by the assignee of this application, the disclosure of which is hereby incorporated by reference.

While the transducer described in the aforesaid patent performs well, the detent force, i.e., the force necessary to move the magnet assembly relative to the stator coil assembly when no electrical power is applied, is relatively large. This detent force is periodic in nature and has a fundamental frequency equal to the reciprocal of the magnet length. If a particular motor was a three-phase motor, the most significant higher frequency force occurs at six times the fundamental frequency, the sixth harmonic. Higher frequency forces require faster commutation of the stator currents and cause greater ripple forces for a given sensor resolution.

The device of this invention overcomes one or more disadvantages of the prior art by reducing the detent force of the transducer. The invention includes an along-path, typically linear, transducer having a first member and a second member being electromagnetically coupled and relatively slidable along a path having spaced end points. The first member includes a plurality of substantially contiguous windings for producing a plurality of magnetic fields having a significant component orthogonal to said path. The second member has a plurality of substantially contiguous permanent magnets of alternate polarity along the path for establishing a magnetic field which reacts with the magnetic fields produced by the first member to produce force along the path. The transition lines dividing adjacent ones of the permanent magnets along the path are formed at a nonperpendicular angle with respect to the path, typically of the order of two degrees from the perpendicular to the path and preferably less than ten degrees.

Other features, objects and advantages of the invention will become apparent from the following detailed description when read in connection with the accompanying drawings in which.

Figure 1:
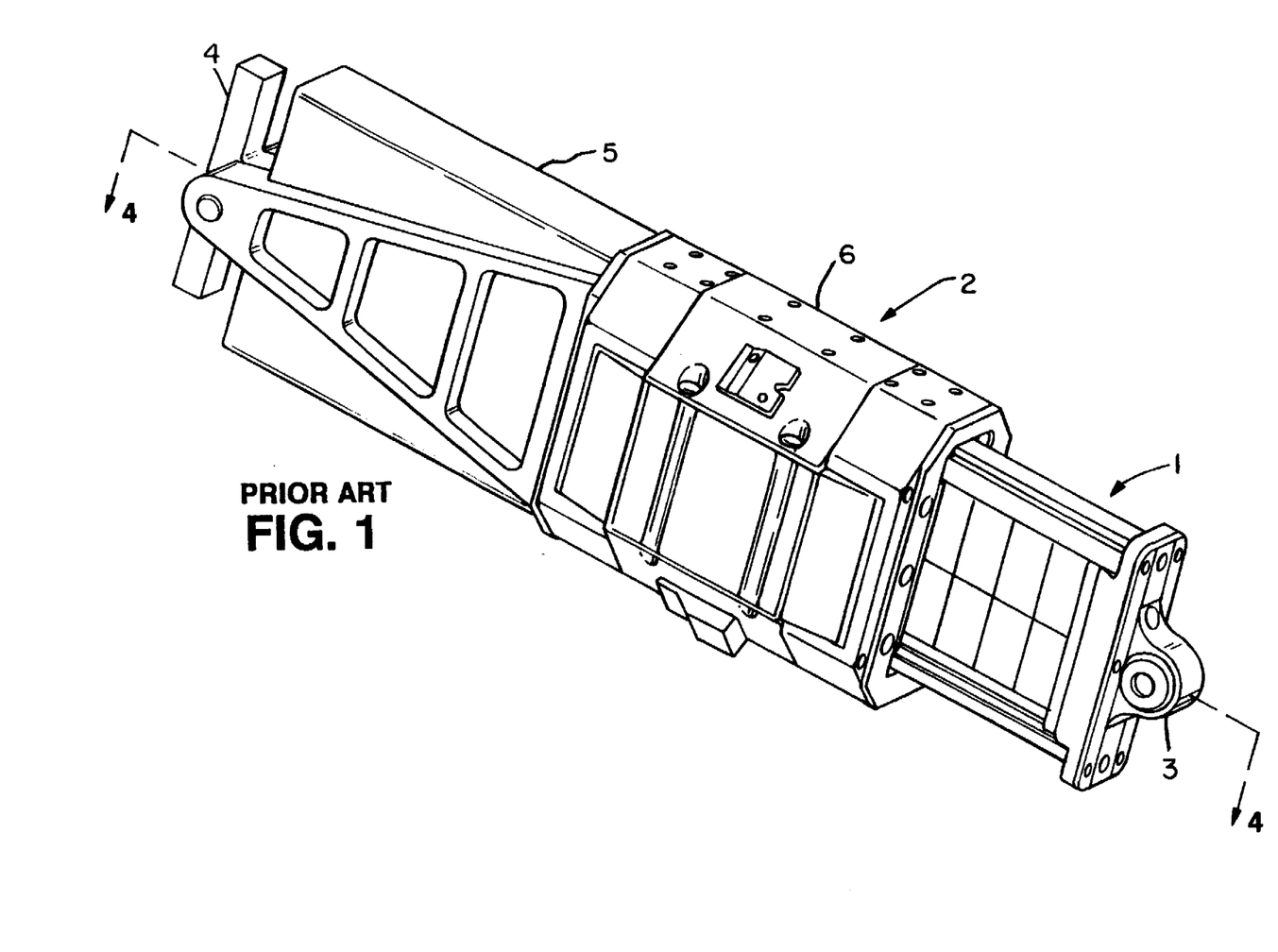
FIG. 1 is a perspective view of a linear transducer disclosed in the aforesaid patent.

With reference now to the drawings and more particularly FIG. 1 thereof, there is shown a perspective view of the transducer disclosed in the aforesaid patent.

An exemplary prior art linear motor is shown in FIG. 1. This motor includes an inside member 1 which has a relatively low mass with respect to an outside member 2 and is movable relative thereto. The exposed end of inside member 1 is provided with a bushing 3 which is connected to the unsprung mass of the vehicle near the wheel assembly. At the opposite end, the outside member 2 is pivotally connected to support member 4 which is attached to the sprung mass (e.g., the vehicle body). Dust cover 5 is provided to protect inside member 1 from dust.

Figure 2:
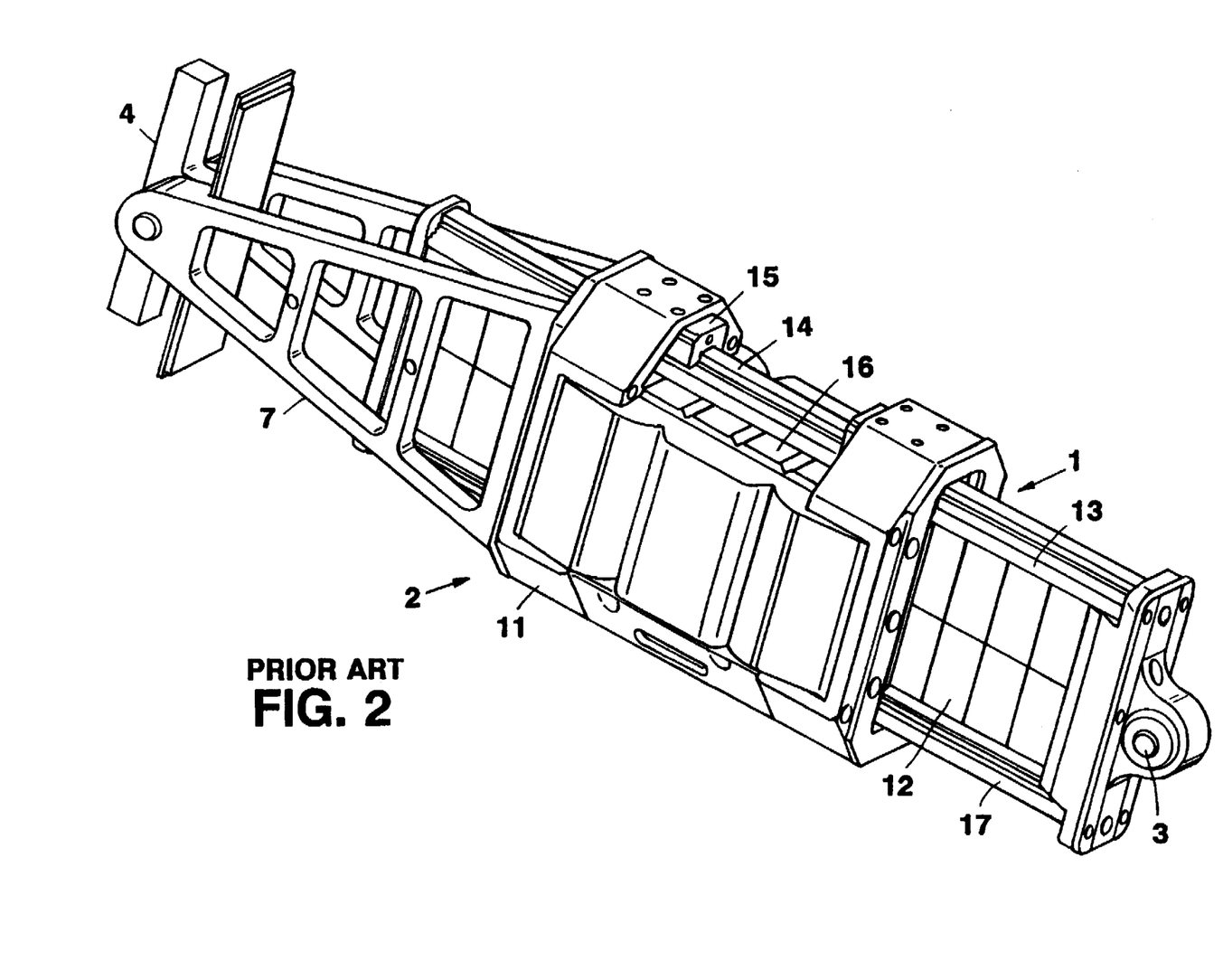
FIG. 2 is another perspective view of the transducer of FIG. 1.
Figure 3:
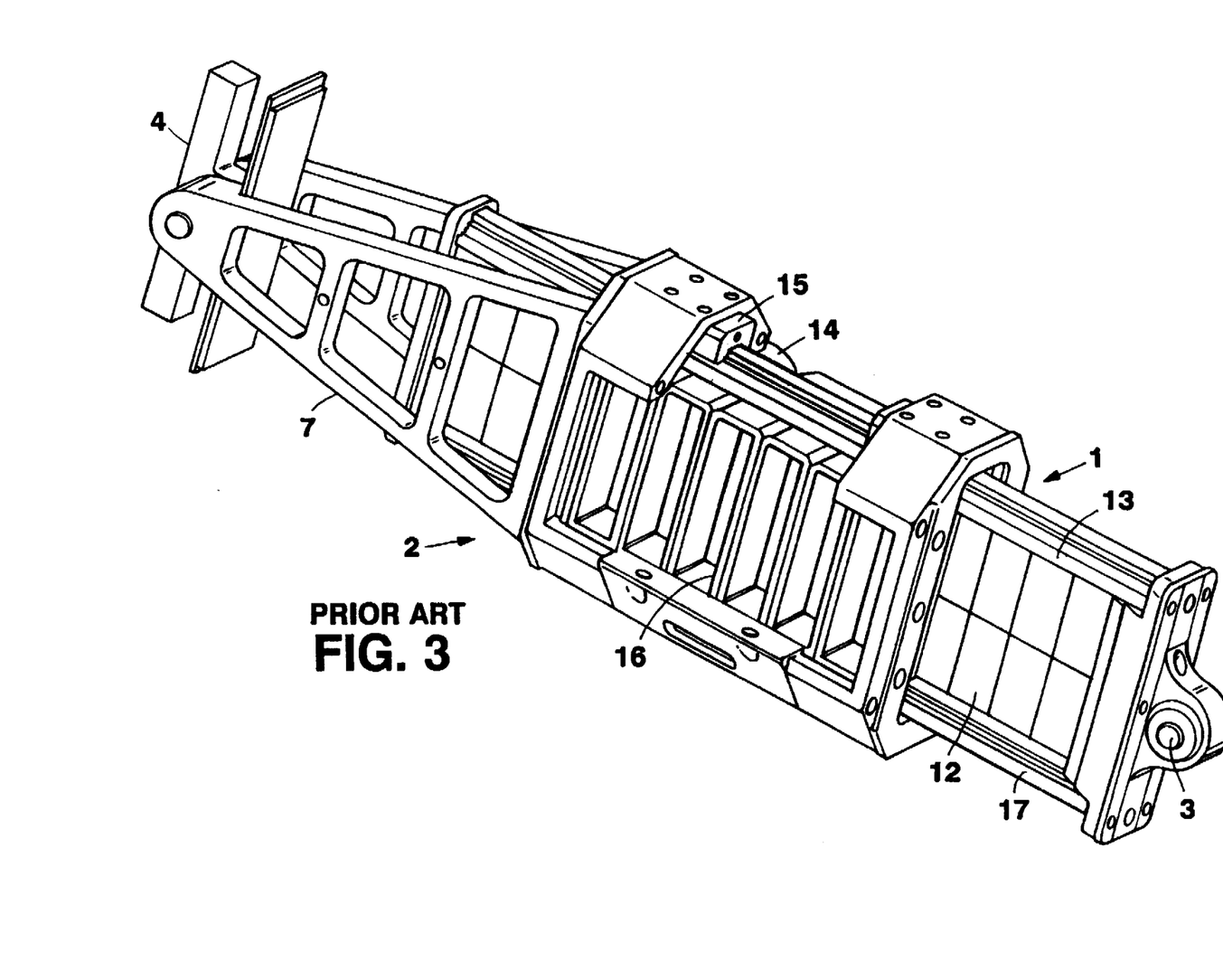
FIG. 3 is a perspective view of the transducer of FIG. 1 with the stator pole assembly removed.
Figure 4:
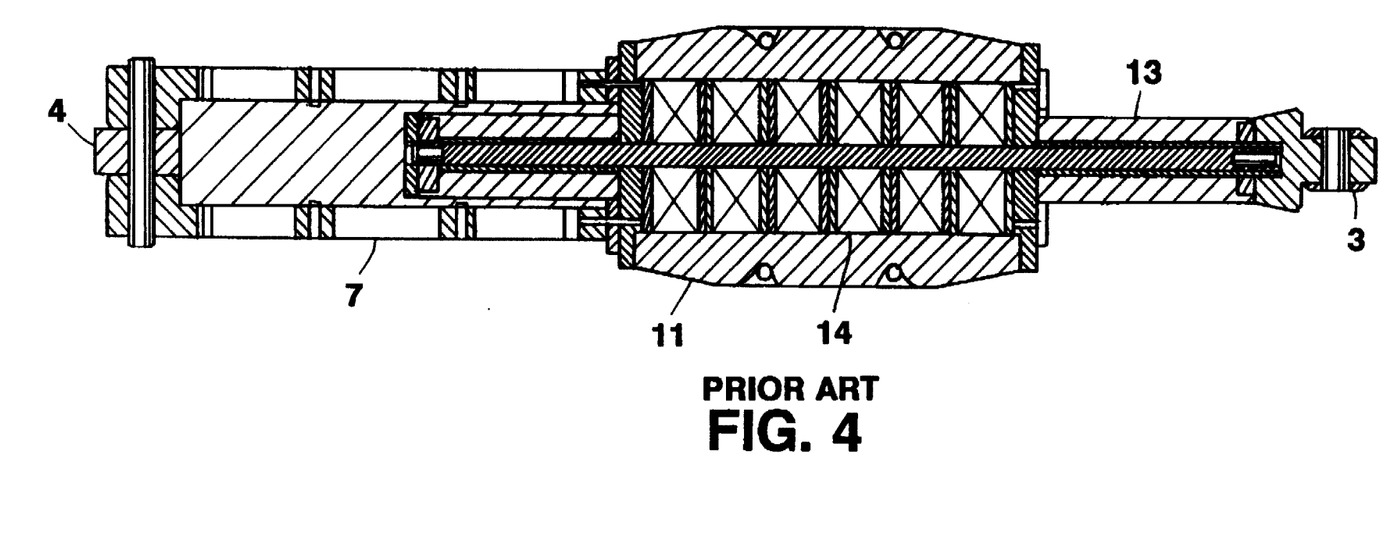
FIG. 4 is a sectional view of the transducer through section 4—4 of FIG. 1.

A perspective view of the linear motor of FIG. 1 is shown in FIG. 2 wherein side cap 6 and dust cover 5 have been removed to show additional structural detail. As shown, the outside member has a mounting frame 7 which is connected to the outside member pole assembly 11. The inside member 1 includes a plurality of rectangular magnets 12 and a sensor magnet holder 13 held in a position relative to a position sensor (not shown). Outside member 2 is provided with coils 16 and linear bearings 15 which engage bearing rails 14 and 17. FIG. 3 shows a perspective view of the prior art transducer of FIGS. 1–2 with the outside member pole assembly 11 removed to illustrate the coils 16. Prior art FIG. 4 is a cross-sectional view along the lines IV—IV of FIG. 1.

Figure 5:
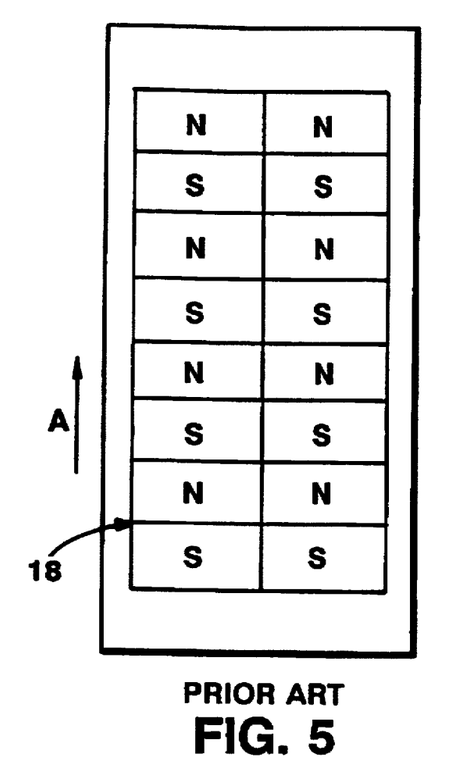
FIG. 5 is a schematic representation of the orientation of the magnets in the inner member disclosed in the aforesaid patent.
Figure 6:
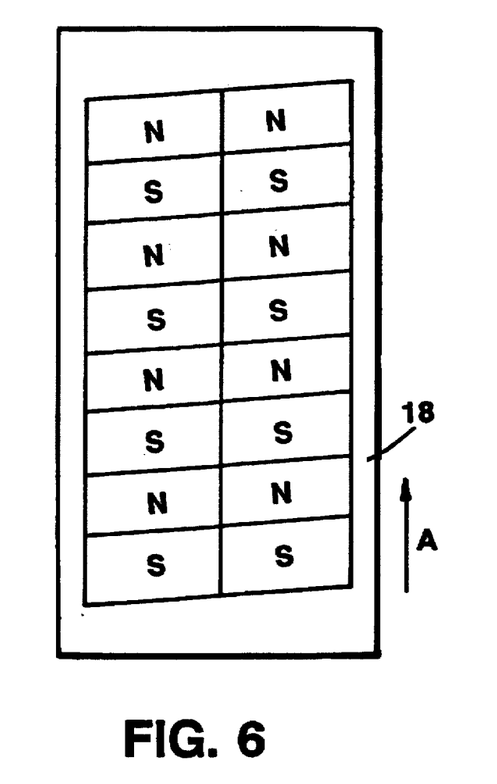
FIG. 6 is a diagram showing placement of the magnets within the inner member according to the invention.

FIG. 5 is a schematic representation of the rectangular magnets of the inside member 1. Horizontal line 18 is a transition line which divides magnets of opposite polarity. As the inside member 1 moves in the direction A, movement across these transition lines causes an abrupt change in the direction of the magnetic flux, thus creating the detent force. In the n-phase transducer the 2nth harmonic of detent force is prominent because the electrical phase centers are offset by ½n times the fundamental wavelength, the fundamental wavelength being equal to the spacing between magnetic transition lines. According to this invention as shown in FIG. 6, however, the transition lines 18 are pitched at an angle so that they are not perpendicular to the direction of movement A. As a result, movement of the inner member causes a gradual, rather than an abrupt, transition in magnetic flux direction. This gradual transition is designed to occur over a distance which is equal to the wavelength of the sixth harmonic of detent force for this particular three-phase transducer. To facilitate assembly, the magnets are rhomboidal rather than rectangular in shape.

Figure 7:
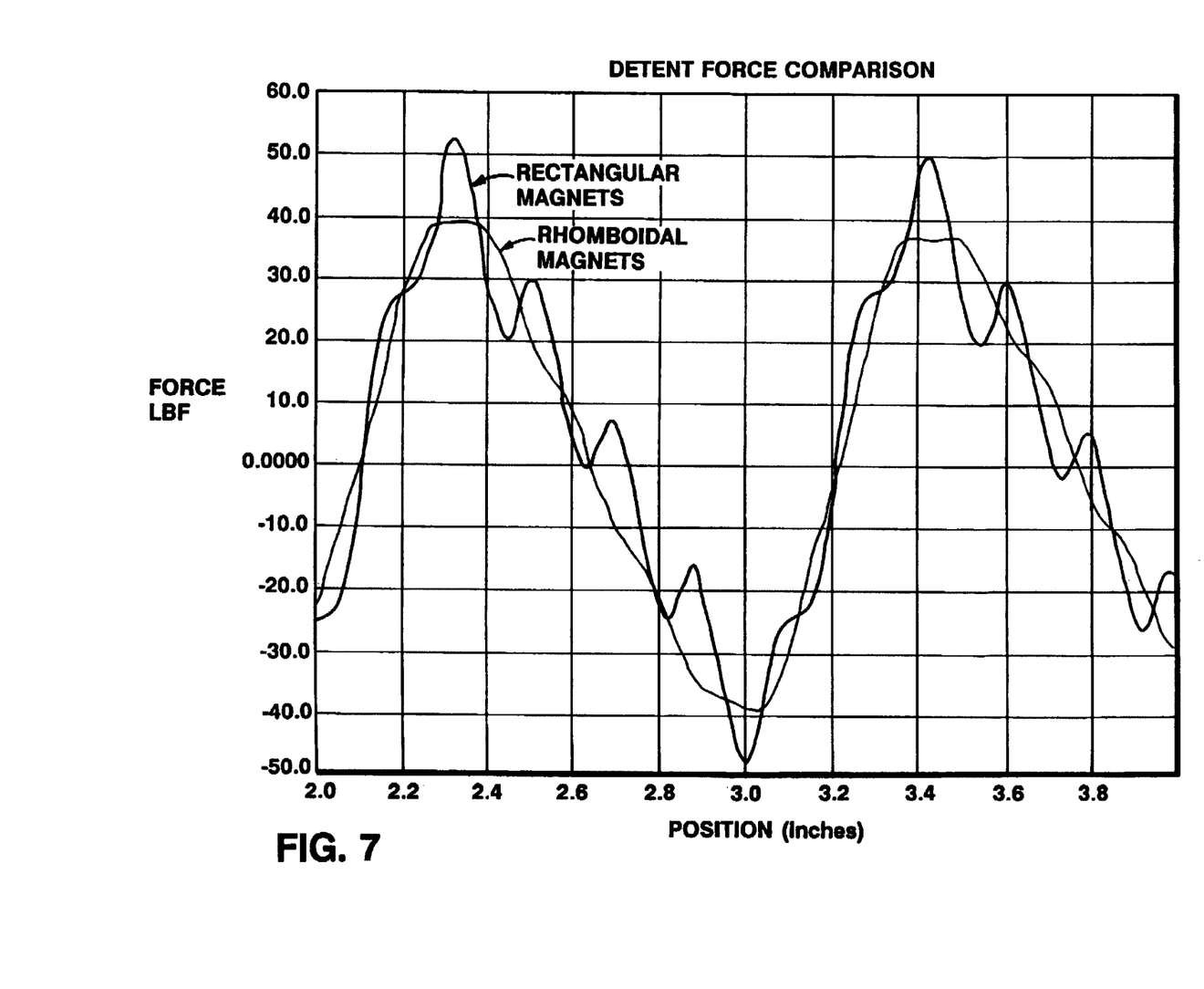
FIG. 7 is a graph showing a comparison of detent forces between a transducer with the inner member of FIG. 5 and a transducer with the inner member of FIG. 6.
Figure 8:
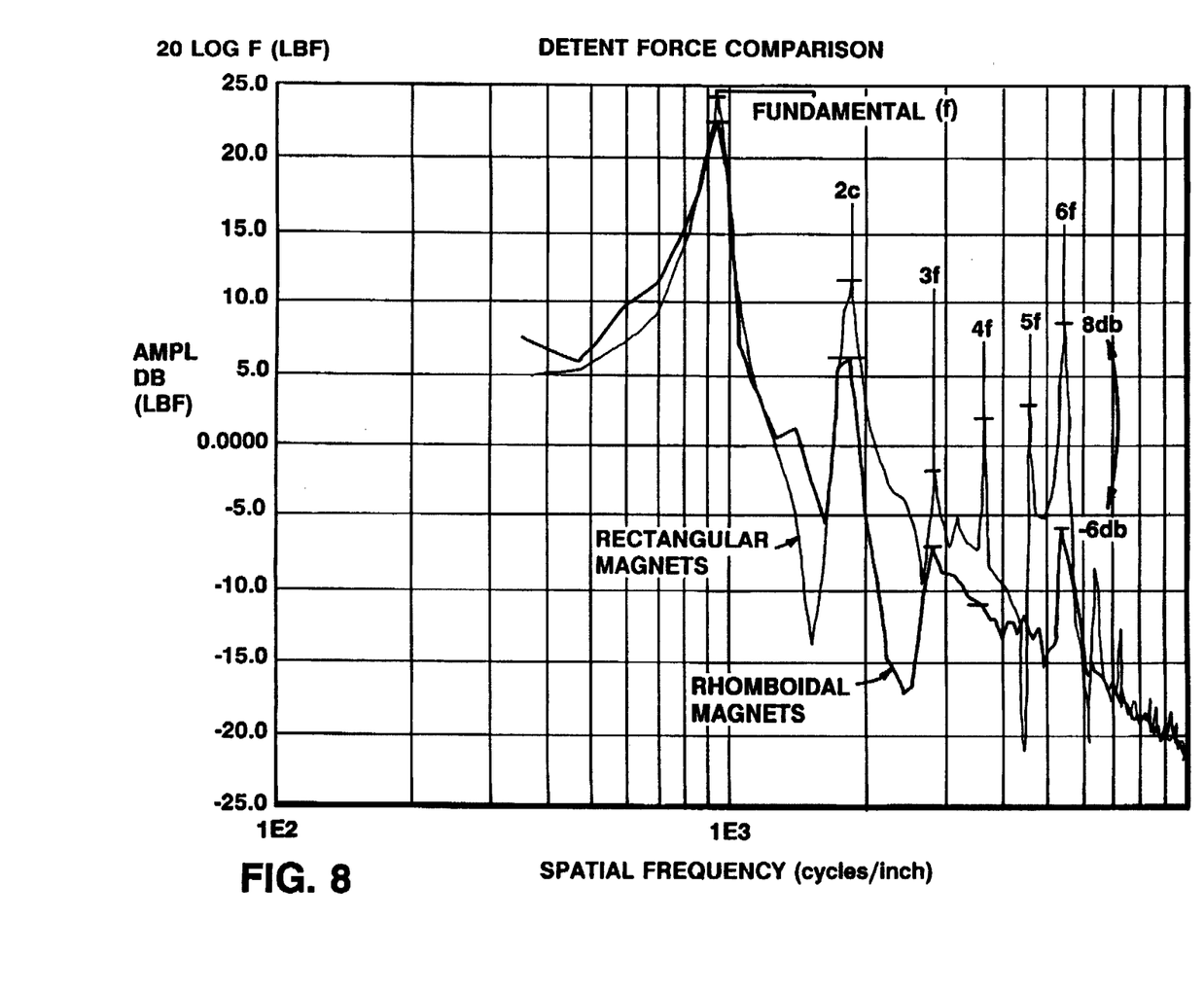
FIG. 8 is a graph showing the data of FIG. 7 converted into the frequency domain.

The advantages obtained by the arrangement of FIG. 6 are illustrated in FIGS. 7–10. FIG. 7 shows force as a function of displacement for both the prior art embodiment of FIG. 5 and the embodiment of the invention shown in FIG. 6. This graph shows that the arrangement of the invention results in a reduction in force of approximately 10 LBF at each peak. The Fourier transform of the data of FIG. 7 is shown in FIG. 8 where the displacement domain (inches) has been converted to the frequency domain. This figure shows a large component reduction for the sixth harmonic and significant reductions at the other harmonics as well. The fundamental and remaining integer harmonics of force are primarily caused by the end discontinuity in the outside member.

Figure 9:
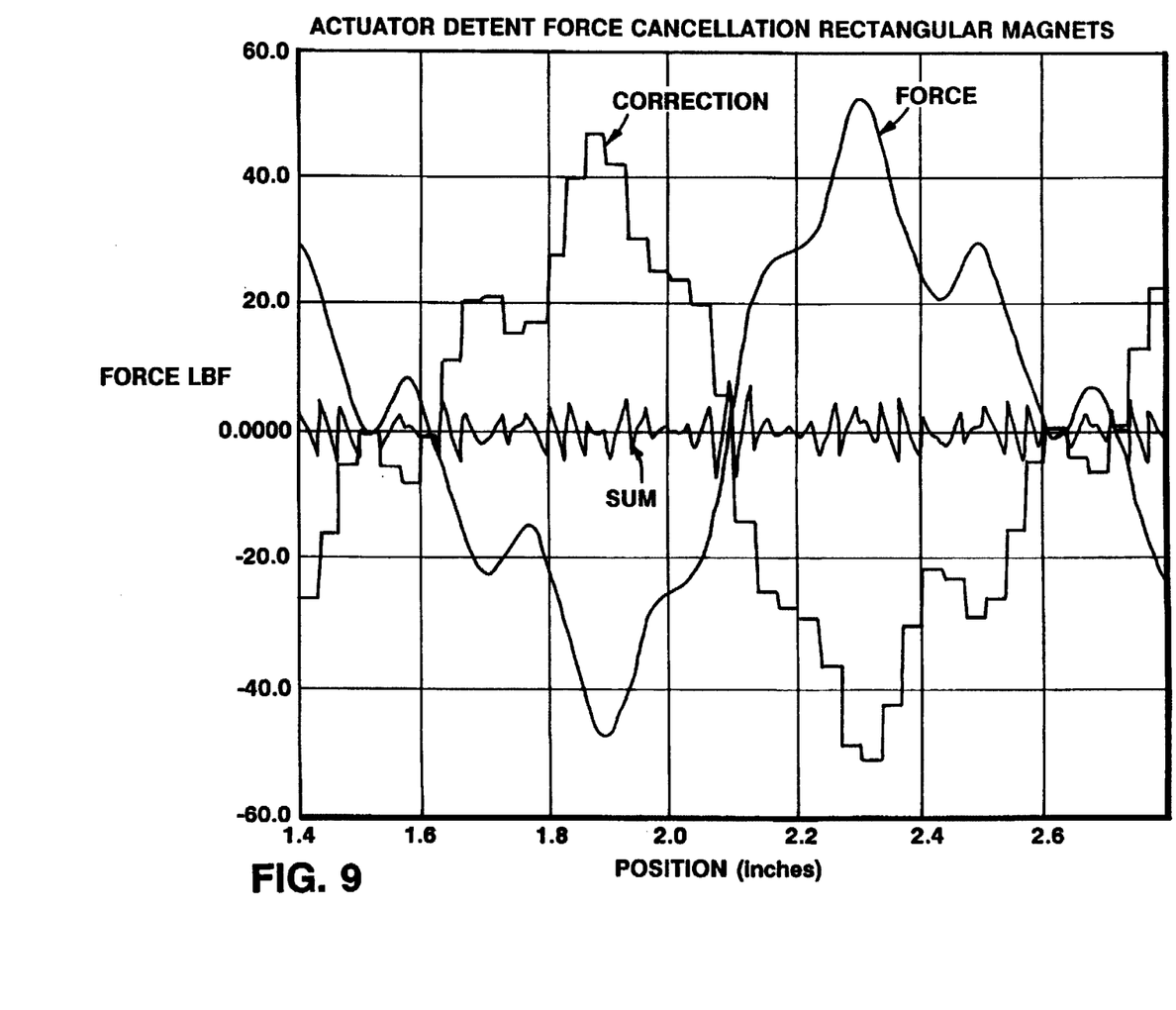
FIG. 9 is a graph showing actuator detent force cancellation for the arrangement of FIG. 5.
Figure 10:
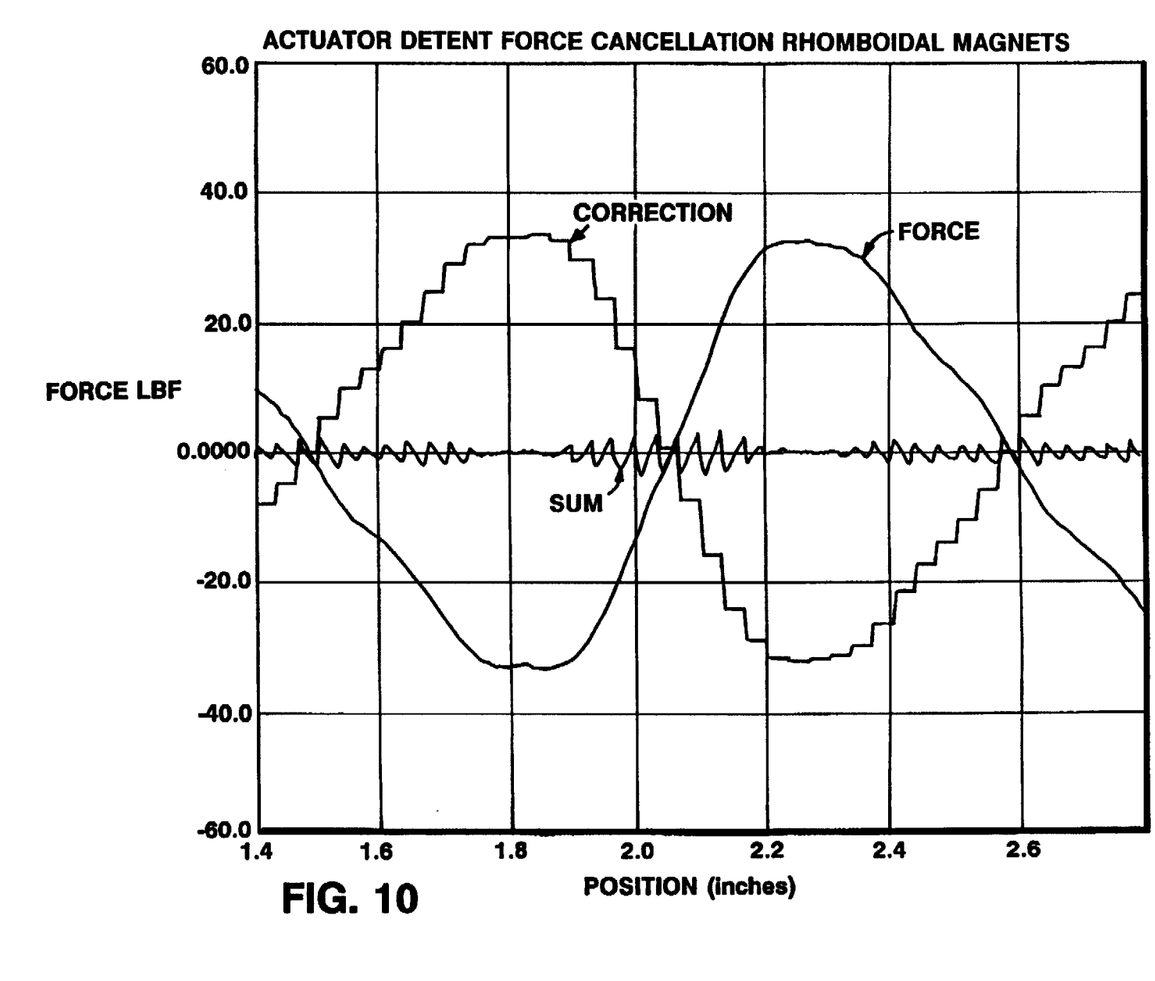
FIG. 10 is a graph shown actuator detent force cancellation for the arrangement of FIG. 6.

FIG. 9 shows the correction force needed to offset the detent force of the prior art linear transducer. Due to the sharp peaks in the detent force of the prior art device, the correction force may not track accurately, producing undesirable periodic forces. FIG. 10, on the other hand, shows the detent force obtained according to the present invention, which has a much smoother profile with harmonic content significantly reduced without significant reduction in useful working force. As a result, the correction force tracks more accurately to improve overall performance.

While there are shown and described present embodiments of the invention, it is to be distinctly understood that the invention is not limited thereto, but may be otherwise variously embodied and practiced within the scope of the following claims.

Other embodiments are within the claims.

What is claimed is:

1. An electromechanical transducer comprising:

a first member and a second member being relatively slidable along a path having spaced end points, said first member and said second member being electromagnetically coupled;

wherein said first member includes a plurality of substantially contiguous windings for producing a plurality of magnetic fields having a significant component orthogonal to said path; and wherein said second member has a plurality of substantially contiguous permanent magnets of alternate plurality along said path for establishing a magnetic field which reacts with the magnetic fields produced by the first member to produce force along said path including detent force with harmonic content and useful working force, wherein transition lines dividing adjacent ones of said permanent magnets along said path are not perpendicular to said path and at such an angle to significantly reduce said harmonic content without significant reduction in said useful working force.

2. An electromechanical transducer as claimed in claim 1, wherein said transducer is a three-phase transducer.

3. An electromechanical transducer comprising, a first member and a second member being relatively slidable along a path having spaced end points, said first member and said second member being electromagnetically coupled;

wherein said first member includes a plurality of substantially contiguous windings for producing a plurality of magnetic fields having a significant component orthogonal to said path; and wherein said second member has a plurality of substantially contiguous permanent magnets of alternate plurality along said path for establishing a magnetic field which reacts with the magnetic fields produced by the first member to produce force along said path, wherein transition lines dividing adjacent ones of said permanent magnets along said path are not perpendicular to said path, wherein a distance along said path from one end of each transition line to the other end thereof is substantially equal to the wavelength corresponding to 2n times the fundamental frequency of the n-phase transducer.

4. An electromechanical transducer comprising:

a first member and a second member being relatively slidable along a path having spaced end points, said first member and said second member being electromagnetically coupled;

wherein said first member includes a plurality of substantially continuous windings for producing a plurality of magnetic fields having a significant component orthogonal to said path; and wherein said second member has a plurality of substantially contiguous permanent magnets of alternate plurality along said path for establishing a magnetic field which reacts with the magnetic fields produced by the first member to produce force along said path including detent force with harmonic content and useful working force, wherein transition lines dividing adjacent ones of said permanent magnets along said path are not perpendicular to said path and at such an angle to significantly reduce said harmonic content without significant reduction in said useful working force, wherein each of said plurality of permanent magnets is rhomboidal in shape.

5. An electromechanical transducer comprising, a first member and a second member being relatively slidable along a path having spaced end points, said first member and said second member being electromagnetically coupled;

wherein said first member includes a plurality of substantially contiguous windings for producing a plurality of magnetic fields having a significant component orthogonal to said path; and wherein said second member has a plurality of substantially contiguous permanent magnets of alternate plurality along said path for establishing a magnetic field which reacts with the magnetic fields produced by the first member to produce force along said path, wherein transition lines dividing adjacent ones of said permanent magnets along said path are not perpendicular to said path, wherein the difference between the angle between said transition lines and said path and a perpendicular to said path is less than ten degrees.

6. An electromechanical transducer as claimed in claim 5, wherein said difference is of the order of two degrees.

* * * * *

UNITED STATES PATENT AND TRADEMARK OFFICE
CERTIFICATE OF CORRECTION

PATENT NO. : 5,701,039  Page 1 of 1
APPLICATION NO. : 08/504434
DATED : December 23, 1997
INVENTOR(S) : James A. Parison et al.

It is certified that error appears in the above-identified patent and that said Letters Patent is hereby corrected as shown below:

Column 3, Claim 1, Lines 22-23, "plurality" should read --polarity--.

Column 3, Claim 3, Line 36, please insert after electromechanical --n-phase--.

Signed and Sealed this

Thirty-first Day of March, 2009

JOHN DOLL
*Acting Director of the United States Patent and Trademark Office*